United States Patent [19]

Werner

[11] 4,326,366
[45] Apr. 27, 1982

[54] SUPPORT PLATE FOR GUIDING HEATING PIPES OF A FLOOR OR WALL HEATING SYSTEM

[75] Inventor: Beat Werner, Dietlikon, Switzerland
[73] Assignee: Thermowag AG, Zürich, Switzerland
[21] Appl. No.: 104,175
[22] Filed: Dec. 17, 1979

[30] Foreign Application Priority Data

Jan. 8, 1979 [CH] Switzerland ............ 123/79

[51] Int. Cl.³ .................................................. E04B 5/48
[52] U.S. Cl. ........................................ 52/220; 52/792
[58] Field of Search ................ 52/220, 792; 165/56, 165/168, 169, 170, 171

[56] References Cited

U.S. PATENT DOCUMENTS

| 3,037,746 | 6/1962 | Williams | 52/220 X |
| 4,250,674 | 2/1981 | Feist | 52/220 |

FOREIGN PATENT DOCUMENTS

| 2225892 | 5/1972 | Fed. Rep. of Germany | 52/220 |
| 2432273 | 1/1976 | Fed. Rep. of Germany | 52/220 |
| 2644711 | 12/1977 | Fed. Rep. of Germany | 52/220 |
| 2725950 | 12/1978 | Fed. Rep. of Germany | 52/220 |
| 2819385 | 11/1979 | Fed. Rep. of Germany | 52/220 |
| 2823236 | 11/1979 | Fed. Rep. of Germany | 52/220 |

Primary Examiner—Price C. Faw, Jr.
Assistant Examiner—Carl D. Friedman
Attorney, Agent, or Firm—Werner W. Kleeman

[57] ABSTRACT

Each support plate is provided at its top surface with substantially cylindrical raised portions or protuberances, between which there is present in each case an intermediate space. The raised portions are arranged in rows extending parallel to one another. The raised portions of one row are offset with respect to the raised portions of both neighboring rows. Each of the raised portions have extending therethrough a recess oriented transversely with respect to the rows. Each of the recesses is in alignment with the intermediate space formed between two raised portions of the neighboring rows. The entire top surface of the support plate is covered with a metallic heat conducting layer. In the intermediate spaces and the recesses it is possible to lay, with a random course of extent or travel, the heating pipes or conduits. The surfaces of the raised portions responsible for the heat transfer between the heating pipes and a cover arrangement or covering are relatively large in relation to the total surface area of the plates, so that ther is present good heat transmission.

17 Claims, 4 Drawing Figures

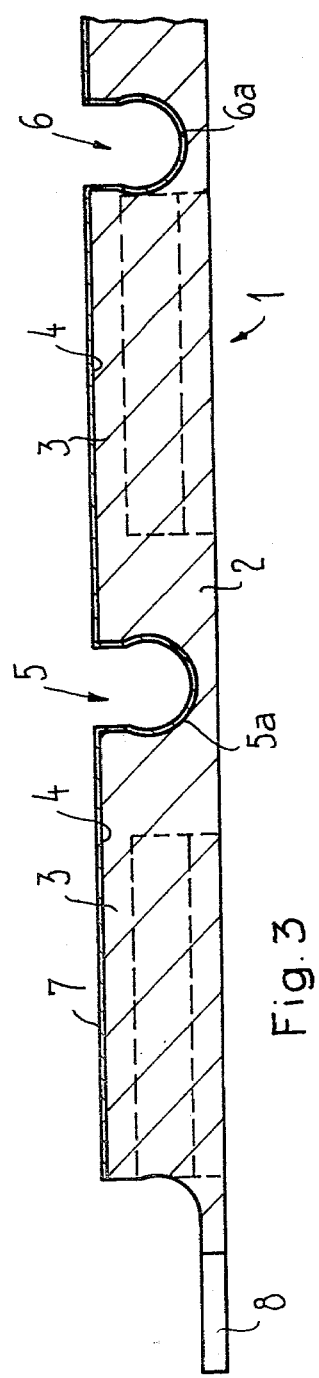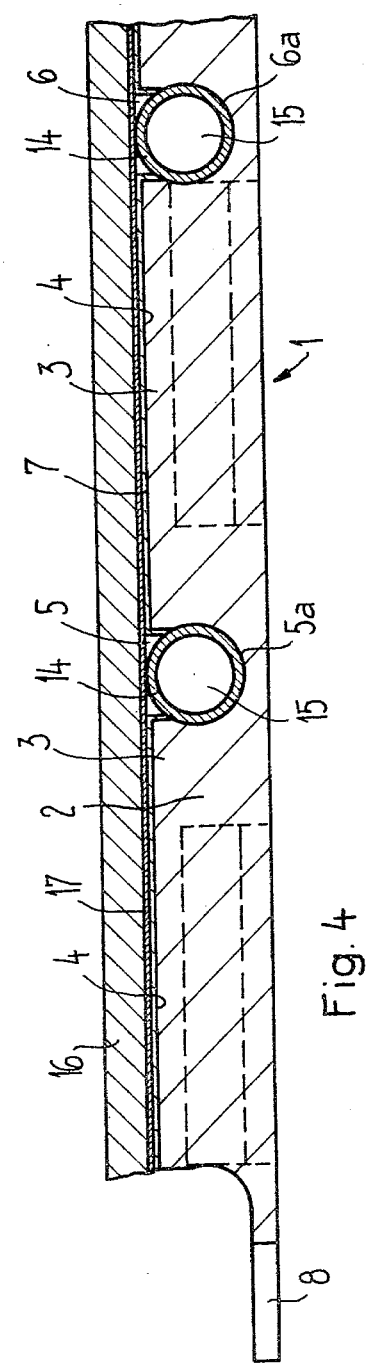

SUPPORT PLATE FOR GUIDING HEATING PIPES OF A FLOOR OR WALL HEATING SYSTEM

BACKGROUND OF THE INVENTION

The present invention relates to a new and improved construction of a support or carrier plate for guiding heating pipes or conduits of a floor or wall heating system, and furthermore, pertains to use of the these support plates in a floor or wall heating system.

Generally speaking, each support plate for guiding the heating pipes of a floor or wall heating system is provided with flattened raised portions at the top surface of the plate or plate member, these raised portions being arranged in mutually parallel rows. Each of the raised portions forms together with each neighboring raised portion an intermediate space.

Such type of support or carrier plate is known to the art wherein, the circular raised portions or protruberances of each second row are offset with respect to the raised portions of the neighboring rows and, in relation to the latter, have a smaller diameter. Between the rows of raised portions there are formed linear extending intermediate spaces in which there can be laid heating pipes or conduits. This renders possible an extensively random straight or curved guiding of the heating pipes. Owing to the relatively large radii of curvature of the heating pipes, which must be maintained during laying of the heating pipes, it is however necessary that the spacing between the raised portions is correspondingly large. Therefore, the top surface of the raised portions, upon which there is placed a cover plate, is correspondingly small in comparison to the total surface area of the support plate. This is disadvantageous in terms of the heat transfer between the support plate and the cover plate.

According to another state-of-the-art design of support plate of this type the aforementioned drawback is eliminated in that, the circular raised portions of the same size are nested in one another such that between the individual rows there is not formed any linear intermediate space for laying of the heating pipes. This has the advantage that the total surface of the raised portions coming into contact with the cover plate is relatively large, thereby rendering possible good heat transfer. Still, this system is afflicted with the drawback that the heating pipes or conduits cannot be laid in a straight line, and therefore, such support or carrier plates cannot be used at sites where there is required a straight guiding of the heating pipes, for instance in corridors. Consequently, with this system design it is necessary for this purpose to use specially constructed plates.

SUMMARY OF THE INVENTION

Therefore, with the foregoing in mind it is a primary object of the present invention to overcome the aforementioned drawbacks and limitations of the prior art systems discussed above.

Another and more specific object of the present invention aims at the provision of a new and improved construction of support plate of the previously mentioned type which affords good heat transfer between the heating pipes and the covering arrangement or elements, and additionally, enables guiding of the heating pipes in any random direction.

Yet a further significant object of the present invention aims at providing a new and improved construction of support plate for guiding heating pipes of a floor or wall heating system, which support plate is relatively simple in construction and design, economical to manufacture, quite easy to install, and enables laying of heating pipes at the support plate in different extending paths of travel.

Now in order to implement these and still further objects of the invention, which will become more readily apparent as the description proceeds, the support plate of the present development is manifested by the features that at least part of the raised portions have extending therethrough at least one recess for the reception of a heating pipe. This recess is open towards the top surface of the support plate.

The recesses provided in the raised portions or protruberances render it possible for the heating pipes not only to be guided in the intermediate spaces between the raised portions, but also through the raised portions themselves. Consequently, it is possible to provide a large design for the structure of the raised portions, and therefore, also the heat transfer surfaces, and the intermediate spaces can be reduced to a minimum dimension and the heating pipes nonetheless can be guided in random directions and at a mutual spacing from one another.

Preferably, the recesses extend linearly in mutually parallel directions which extend transversely or parallel to the rows of the raised portions. It is further of advantage if the raised portions of one row are offset with respect to the raised portions of both neighboring rows and the recesses which extend transversely with respect to the rows of the raised portions are aligned with the intermediate spaces between raised portions of the neighboring rows. In this way there is rendered possible linear guiding of the heating pipes, and the spacing between neighboring, parallelly extending heating pipes can be maintained, as the situation demands, smaller or greater in a very simple manner by appropriately laying the pipes.

The use of such support plates in a floor or wall heating system is manifested by the features that the adjoining or abutting support plates or plate members are covered by cover plates which abut one another and bear upon the raised portions.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a sectional view, taken substantially along the line III—III of FIG. 1; and FIG. 4 is a sectional view of part of a floor heating system.

DETAILED DESCRIPTION OF THE PREFERRED EMBODIMENTS

Figure 1:
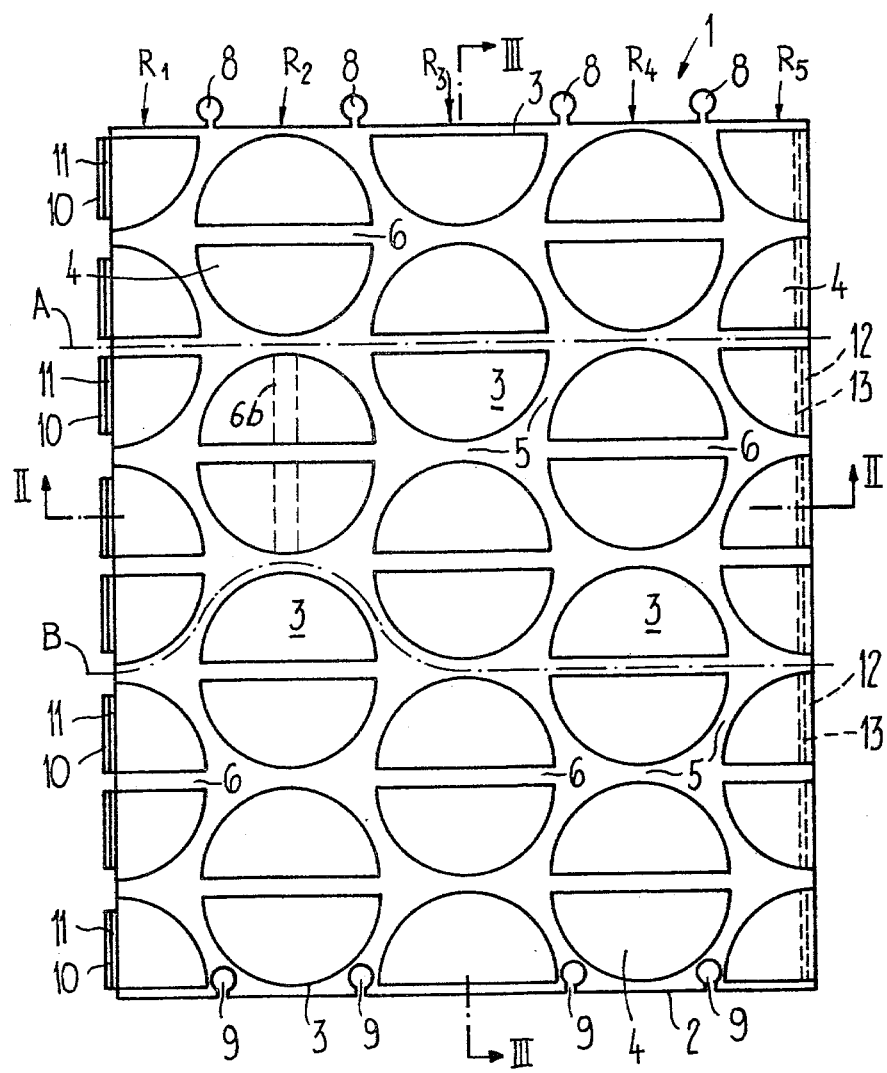
FIG. 1 is a top plan view of a support or carrier plate constructed according to the invention.

Describing now the drawings, as best seen by referring to FIG. 1 the support or carrier plate 1, advantageously formed of plastic, possesses a substantially rectangular plate body 2 which is provided at its not particularly referenced top surface or side with cylindrical raised portions or protuberances 3 of the same diameter.

These raised portions 3 have a flat top surface. As equally seen by reverting to FIG. 1, these raised portions 3 are arranged in rows $R_1$ to $R_5$, these rows extending essentially parallel to one another. Between the individual raised portions 3 there are formed intermediate spaces 5, whose cross-section is illustrated in FIG. 3. The lower portion 5a of such intermediate spaces 5 has a circular segment-shaped or arcuate cross-sectional configuration, in order to ensure contact of the heating pipes or conduits 14 with the support or carrier plate or plate member 1. The raised portions 3 of a row, for instance the row $R_3$, are offset with respect to the raised portions 3 of the neighboring rows, for instance the rows $R_2$ and $R_4$. Furthermore, each raised portion 3 engages between two raised portions of the neighboring row or rows, so that between the raised portions 3 there is not formed any linear path, rather only curved paths for the heating pipes or conduits 14. Due to this offset arrangement of the raised portions 3 there is beneficially attained the result that the entire surface of the raised portions is relatively large in comparison to the entire surface of the plate or plate member 1.

Each of the raised portions 3 has piercingly extending therethrough at least one recess 6, these recesses 6 extending along a diameter of the related raised portion 3 and transversely with respect to the direction of extent of the rows $R_1$–$R_5$, although as will be explained more fully hereinafter a different arrangement is equally possible. Moreover, each recess 6 is aligned with the intermediate space 5 which is formed between two raised portions 3 of the neighboring rows. Hence, by virtue of the mutually aligned recesses 6 which are also aligned with the intermediate spaces 5 between the raised portions 3 there is formed a straight or linear path, as the same has been schematically represented by the chain-dot line A shown in FIG. 1. As best seen by referring to FIG. 3, these recesses 6 correspond in their cross-sectional shape to the intermediate spaces 5, and therefore, likewise have a lower portion 6a whose cross-section is in the form of a segment or part of a circle.

The top surface of the support plate 1, i.e. the surfaces 4 of the raised portions 3, the intermediate spaces 5 and also the recesses 6, are covered with a heat conducting layer 7 formed of metal, preferably aluminium. This heat conducting layer 7 serves for distributing the heat which is delivered by the heating pipes or conduits 14.

Figure 2:
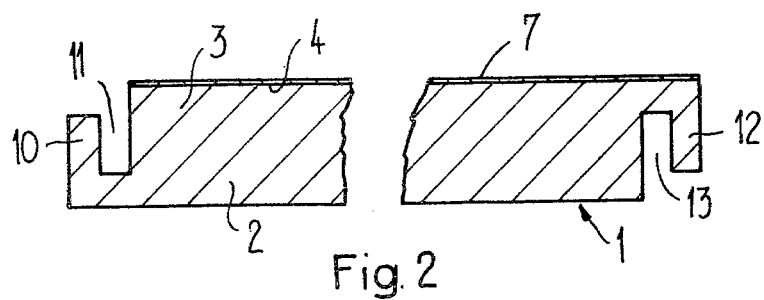
FIG. 2 is a sectional view, taken substantially along the line II—II of FIG. 1.

At one side or end of the plate body 2 there protrude therefrom connection heads or elements 8 which engage in recesses 9 of the next neighboring plate body 2 in order to interconnect two neighboring support plates or plate members 1 with one another. As best seen by referring to FIG. 1 these recesses 9 are formed to lie opposite the connection heads or elements 8 of the plate body 2. At both other sides or ends of the plate body 2 there are likewise provided connection elements for interconnecting such support plate 1 with the neighboring support plate. As clearly shown in FIGS. 1 and 2 these connection elements 10 and 12 are formed as ledges arranged at a mutual spacing from one another along the sides of the related plate body 2. Between the connection elements 10 and 12 and the plate body 2 there are formed intermediate spaces 11 and 13, respectively, intended to receive the connection elements 10 and 12 of the neighboring support plate 1. To interconnect two support plates 1 the connection elements 10 of one support plate 1 engage into the intermediate spaces 13 of the other support plate 1, while at the same time the connection elements 12 of this other support plate 1 engage into the intermediate spaces 11 of the first-mentioned support plate 1. Due to this mutual tooth-like meshing engagement of the connection elements the support plates 1 are positively fixed in position.

Turning attention now to FIG. 4 there is illustrated part of a floor heating system in sectional view. As clearly shown in FIG. 4 heating pipes or conduits 14 extend into the intermediate spaces 5 and the recesses 6 of the support plate 1. Flowing through the heating pipes 14 is any suitable heat carrier or medium 15, typically for instance water. These heating pipes 14 are located at the lower portions or regions 5a and 6a of the related intermediate spaces 5 and recesses 6 and part of the circumferential region of the heating pipes 14 is in intimate contact with the metallic layer or covering 7 which covers such lower portions 5a and 6a. The heat which is delivered by the heating medium 15 is therefore transferred to the heat conducting layer 7, which, in turn, ensures for a uniform heat distribution over the surface of the plate body, especially over the top surfaces 4 of the raised portions 3. At these top surfaces 4 of the raised portions 3 there bears a cover plate or covering 16 which is likewise provided at its underside, confronting the support plate 1, with a heat conducting layer 17 formed of metal, preferably aluminium. This heat conducting layer 17, in turn, ensures for a faultless heat distribution over the underside of the cover plate 16. These cover plates 16 are laid on the support plates 1 such that the joints between the cover plates 16 are offset in relation to the joints between the support or carrier plates 1.

During the mounting or assembly of this floor heating system the support plates 1 are placed upon an understructure or construction. Thereafter, the heating pipes are laid in accordance with the prevailing local thermal requirements. The direction and also the mutual spacing between the heating pipes or conduits 14 can be randomly chosen and accommodated to the prevailing requirements, by virtue of the described construction of the support plates 1. As already mentioned in conjunction with the description of FIG. 1, it is possible for instance to lay the heating pipes 14 so that they are linearly guided, as such has been shown in FIG. 1 by the chain-dot line A. Apart from the foregoing it is also possible to lay the heating pipes 14 so that they follow a random curved configuration, as for instance indicated by the chain-dot line B of FIG. 1. After laying the heating pipes the cover plates 16, likewise formed of plastic, are laid on the support plates 1. These cover plates 16 can serve as a support or substrate for a floor covering, for instance wall-to-wall carpeting.

As already explained, the construction of the support plates 1 allows for random laying of the heating pipes 14. Since additionally the heat transmitting surface 4 of the raised portions 3 is relatively large, there is ensured for good heat transfer between the heating pipes or conduits 14 and the cover plates or plate members 16. Both of the heat conducting layers 7 and 17 additionally render possible an essentially constant distribution of heat over the entire surface of the cover plates 16. The support plates 1, formed of plastic, additionally serve as a thermal insulator, so that the heat which is infed by means of the heating medium or carrier 15, cannot flow downwardly as waste heat. The support plate 1 can be provided at its underside with a sectional shape or profile which serves to improve the insulation of impact sounds.

It is also conceivable to provide in each raised portion 3 more than one recess 6. Thus, for instance, it is possible to have extending through the raised portions 3 a second recess, as shown in broken lines in FIG. 1 and designated by reference character 6b, dispositioned at right angles with respect to the first recess 6. It is equally conceivable, when using only a single recess 6, to arrange such recess so that it does not extend, as shown in FIG. 1, perpendicular to the lengthwise direction of the rows $R_1-R_5$, rather extends in the lengthwise direction thereof.

While there are shown and described present preferred embodiments of the invention, it is to be distinctly understood that the invention is not limited thereto but may be otherwise variously embodied and practised within the scope of the following claims. Accordingly,

What I claim is:

1. A support plate for guiding heating pipes of a floor or wall heating system, comprising:
    a plate body having a plate top surface;
    substantially cylindrically raised portions having a substantially flat top surface and being arranged at the plate top surface in mutually parallel rows;
    each two neighboring raised portions forming therebetween an intermediate space;
    all of said raised portions having substantially the same dimensions;
    the raised portions of one row being offset with respect to the raised portions of both neighboring rows in the lengthwise direction of said rows;
    at least part of the raised portions having a recess extending therethrough for receiving a heating pipe; and
    said recess opens towards the top surface of the raised portion.

2. The support plate as defined in claim 1, wherein:
    said recesses extend in substantially linear mutually parallel directions.

3. The support plate as defined in claim 2, wherein:
    said recesses extend transversely with respect to the rows of raised portions.

4. The support plate as defined in claim 1, wherein:
    said recesses extend essentially parallel to said rows of raised portions.

5. The support plate as defined in claim 3, wherein:
    said recesses which extend transversely with respect to the rows of raised portions are aligned with the intermediate spaces between two raised portions of the neighboring rows.

6. The support plate as defined in claim 1, wherein:
    said recesses extend along a diameter of the related raised portion.

7. The support plate as defined in claim 1, further including:
    a heat conducting layer provided at the top surface of the support plate.

8. The support plate as defined in claim 7, wherein:
    said heat conducting layer is formed of metal.

9. The support plate as defined in claim 8, wherein:
    said metal is aluminium.

10. The support plate as defined in claim 1, wherein:
    a plurality of said support plates are arranged in abutting relationship; and
    cover plates adjoining one another and bearing upon the raised portions of the adjoining support plates.

11. The support plate as defined in claim 10, wherein:
    the joints between neighboring covering plates are offset with respect to the joints between the support plates.

12. The support plate as defined in claim 11, wherein:
    the cover plates are provided at the side confronting the support plates with a heat conducting layer.

13. The support plate as defined in claim 12, wherein:
    said heat conducting layer is formed of metal.

14. The support plate as defined in claim 13, wherein:
    said metal is aluminium.

15. The support plate as defined in claim 10, wherein:
    the cover plates are provided at the side confronting the support plates with a heat conducting layer.

16. The support plate as defined in claim 15, wherein:
    said heat conducting layer is formed of metal.

17. The support plate as defined in claim 16, wherein:
    said metal is aluminium.

* * * * *